United States Patent

[11] 3,604,335

| [72] | Inventor | Jacques-Daniel Lafitte |
| | | 136 Avenue d'Argenteuil, Asnieres, France |
| [21] | Appl. No. | 18,044 |
| [22] | Filed | Mar. 10, 1970 |
| [45] | Patented | Sept. 14, 1971 |
| [32] | Priority | Nov. 6, 1969 |
| [33] | | France |
| [31] | | 69.38232 |

[54] DEVICE FOR REGULATING THE TEMPERATURE OF THE INFUSION WATER IN A MACHINE FOR PREPARING COFFEE AND SIMILAR INFUSIONS
7 Claims, 3 Drawing Figs.

| [52] | U.S. Cl. | 99/302 P |
| [51] | Int. Cl. | A47j 31/24 |
| [50] | Field of Search | 99/302, 301 P, 300, 303, 299, 297, 281, 283 |

[56] References Cited
UNITED STATES PATENTS

| 2,878,747 | 3/1959 | Cimbali | 99/302 P |
| 3,110,243 | 11/1963 | Cimbali | 99/302 P |
| 3,203,340 | 8/1965 | Totten | 99/302 P |
| 3,266,410 | 8/1966 | Novi | 99/302 P |
| 3,286,618 | 11/1966 | Barrera | 99/302 P |

Primary Examiner—Robert W. Jenkins
Attorney—Walter Becker

ABSTRACT: Device for regulating the temperature of the infusion water in a machine for preparing coffee and similar infusions comprising a tubular body containing a cylinder in which a piston defines two chambers for alternative communication with an inlet and a discharge cold water pipe, the tubular body further comprising a cavity for holding hot infusion water kept in communication with a plunger tube partly interned in a boiler for providing hot water under pressure and with at least one duct made in the tubular body to emerge in the infuser piston cylinder.

PATENTED SEP14 1971

INVENTOR:
Jacques Daniel Lafitte

By Walter Becker

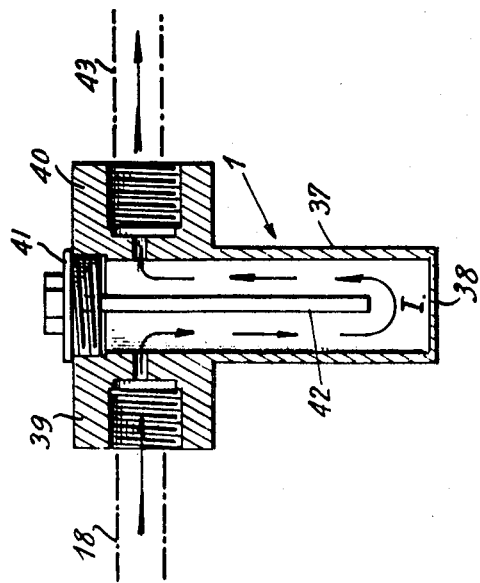
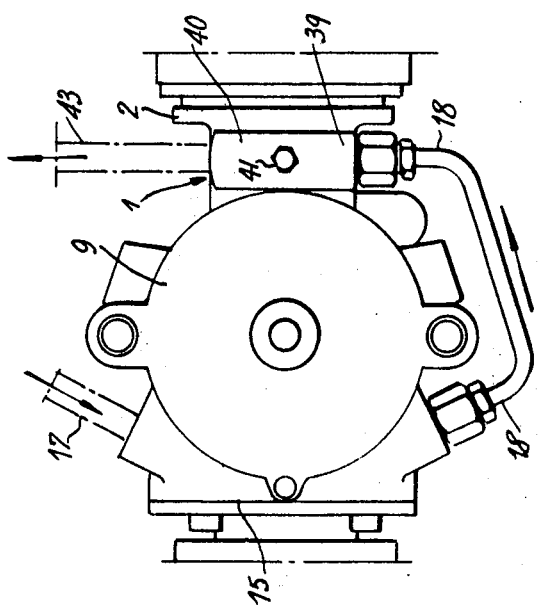

DEVICE FOR REGULATING THE TEMPERATURE OF THE INFUSION WATER IN A MACHINE FOR PREPARING COFFEE AND SIMILAR INFUSIONS

In the machines for preparing coffee and other infusions, the water made to infuse and pass through the powdered product provided for this purpose is supplied by a boiler kept under pressure and generally raised to a temperature of about 120° C. This means that the portion of infusion water coming from the boiler and admitted into the infuser body has a high temperature, frequently in the region of 90° C. in the best conditions, which has the effect of scorching the powdered product, and consequently, destroying its flavor and spoiling the taste of the infusion.

To lower the temperature of the quantity of infusion water, provision is generally made for including a very thick metal infuser body in the machine, so as to remove part of the calories from the quantity of water admitted. By means of such an arrangement appreciably better results may be obtained, but it will be understood that at the end of a certain working time, the metal body is itself raised to the temperature of the water coming from the boiler, and thus is no longer able to fulfill the function for which it has been provided and lower the temperature.

Other solutions have also been proposed, but they generally lead to complicated and expensive embodiments, whose working does not have the characteristics of the desirable regularity and liability.

The present invention obviates the above-mentioned disadvantage s by creating a device for regulating the temperature of the infusion water; said device is devised, in an extremely simple and cheap manner and can be quickly adapted, without a particularly long and delicate machining operation, on most of the automatic machines for preparing coffee and other infusions.

According to the invention, the device for regulating the temperature of the infusion water in a machine for making coffee and similar infusions comprises an infuser body containing an infuser piston rigidly connected to a driving piston housed in a cylinder, said driving piston defining in said cylinder two variable volume chambers, a four-way cock to put in communication alternatively said two variable volume chambers respectively with an inlet pipe for cold water under pressure and a discharge pipe, and is characterized in that it consists of a tubular body provided with two connections, of which one is branched on to the discharge pipe for cold water coming from the driving piston chambers, the other being connected to an emptying pipe, said tubular body being mounted in the infuser body for traversing at least part of an infusion water retaining cavity defined by the body and kept in communication, on the one hand, with a plunger tube partly enclosed in a boiler for supplying hot water under pressure, and on the other hand, with at least one duct made in the infuser body for emerging in the infuser piston cylinder.

Various other characteristics of the invention will moreover by revealed by the detailed description which follows.

An embodiment of the invention is shown, by way of nonrestrictive example, in the accompanying drawings.

FIG. 2 is a plan view along the line II—II of FIG. 1.

FIG. 3 is a cross section taken along the line III—III of FIG. 1.

Figure 1:
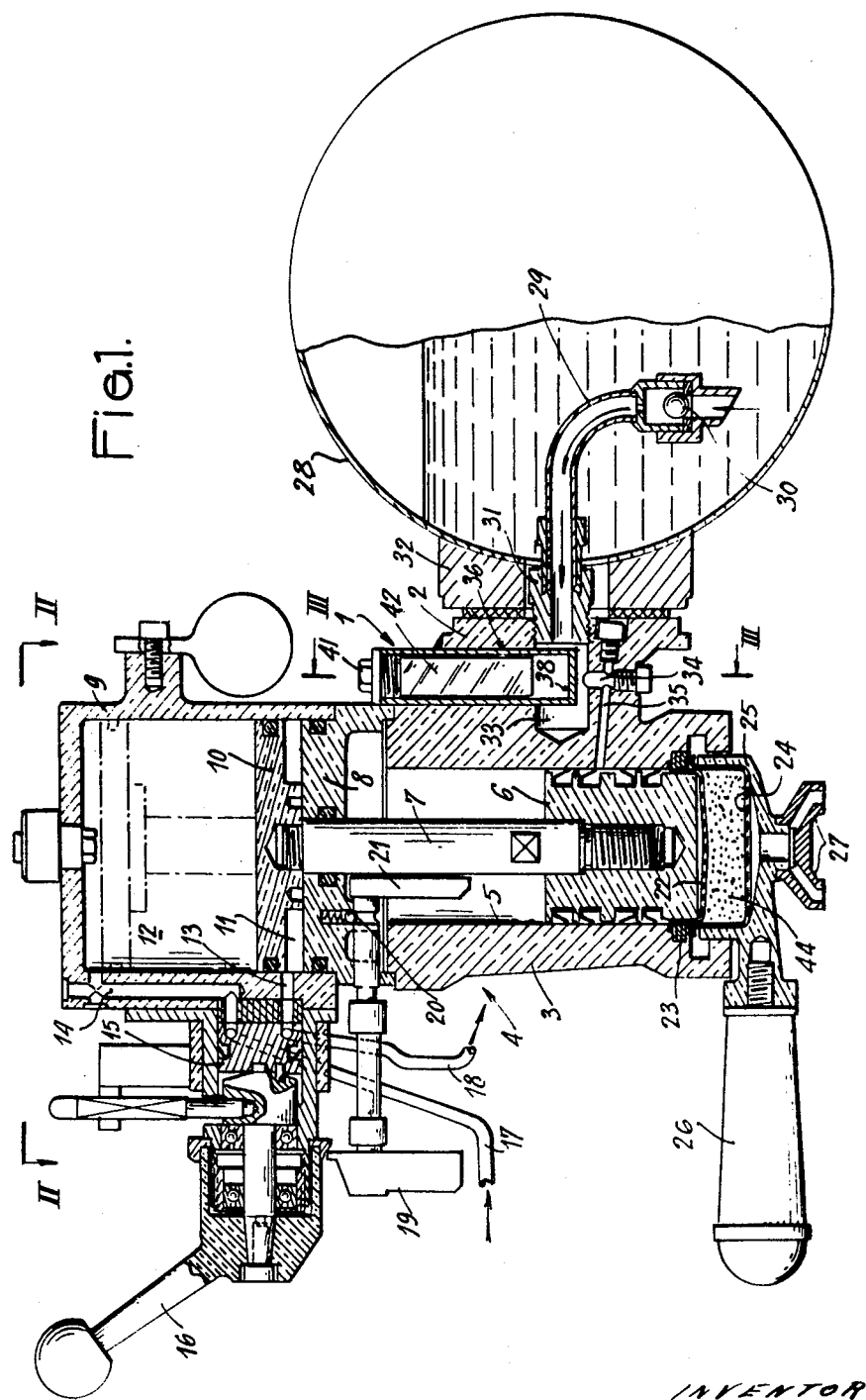
FIG. 1 is an elevation of a machine for making coffee or other infusions fitted with the device for regulating temperature according to the invention.

According to FIGS. 1 and 2, the device for regulating infusion water temperature designated on the whole by the reference numeral 1 is fitted to the rear part 2 of the infuser body 3 of a machine 4 for automatically making coffee, for instance. The infuser body 3 defines a bore 5 containing a piston 6 sliding with a tight fit and mounted at the end of a rod 7 guided in a partition 8 closing the infuser body 3 at its top part. The partition 8 also forms the fitting base for a driving cylinder 9 containing a driving piston 10 sliding with a tight fit and attached to the end of the rod 7 opposite the infuser piston 6. The driving piston 10 is made so as to define two variable volume chambers 11 and 12 inside the cylinder 9, respectively communicating with ducts 13, 14 which may be put into relation, by means of a four-way cock 15 controlled by an operating handle 16, selectively with a pipe 17 for water intake under pressure, and a return or discharge pipe 18. The four-way cock 15 is more particularly made so that when, for instance, the duct 13 is put into communication with the return or discharge pipe 18, the duct 14 is connected to the inlet pipe for water under pressure 17, and inversely.

Although not shown, the operating handle 16 can by associated with a device to control the infusion time, as it is known in itself.

The operating handle 16 is completed by a hand-lever 19 mounted either across the infuser body 3, or across the partition 8 for controlling, by means of a selective bolt 20, the position of a member limiting the active stroke of the infuser piston 6 formed, in this instance, by a finger 21 placed inside the bore 5 on the piston trajectory 6.

The bottom part of the infuser body 3 is closed by an end or filter 22 extending in a plane slightly lower than a gasket 23 supporting the peripheric edge of a removable filter 24 housed inside a cup 25 able to be enclosed and tightened, by rapid assembling means, on the base of the infuser body 3. The cup 25 is associated with an operating handle 26, and comprises one or more pouring taps 27 at its bottom part.

In a known manner, the infuser body 3 is mounted on a boiler 28 kept under pressure, for instance by heating the water it contains, up to a temperature of about 120° C. The boiler 28 contains a plunger tube 29, mounted opposite a nonreturn valve 30, in a connection 31 loosely traversing collar or base 32 supporting and fixing the machine 4. This connection 31 is adapted on the rear part 2 for communicating with a cavity 33 forming a reserve as well as an expansion chamber whose function will be shown in what follows. The cavity 33 communicates by a hole or duct 34 with a channel 35 emerging in the bore 5.

According to the invention, the rear part 2 of the body 3 defines a well 36 emerging in the cavity 33 and intended to receive the temperature regulating device 1. This device chiefly consists, as can be seen in FIGS. 1 and 3, of a cylindrical tubular body 37 forming opposite to a bottom 38, two connections 39 and 40. The body 37 and bottom 38 are made of a good heat-conductive material, and preferably, have a relatively slight thickness for favorizing heat exchange by conduction. The terminal part of the cylindrical tubular body 37, opposite to the bottom 38, is arranged for mounting a fluidtight plug 41 forming a supporting member for a disturber 42 made by a plate whose width corresponds, approximately, to the internal diameter of the cylindrical tubular body 37 and whose length is less than that of said tubular body. The plug 41 is fitted so as to ensure with watertightness that the disturber 42 is arranged inside the tubular body 37 perpendicularly to the common axis of the connections 39 and 40.

The regulating device 1 is fitted in the well 36 so that the lower terminal part of the tubular body 37 plunges into the cavity 33 to an axial extent appreciably corresponding to the space I existing between the end of the disturber 42 and the bottom 38. The fitting of the tubular body 37 is done with watertightness while ensuring the orientation of the connections 39 and 40 for respectively facilitating the branching of the return or discharge pipe 18 ensuring the flow of the water discharged from any one of the two chambers of the cylinder 9 and an emptying pipe 43.

The regulating device works in the following manner:

In the position shown in FIG. 1, the hot water from the boiler 28 goes through the plunger tube 29 for totally filling the cavity 33 as well as the hole or duct 34 and the channel 35 closed by the infuser piston 6. Said infuser piston has been taken in the low position by the action of the driving piston 10 displaced vertically by admitting cold water coming from the pipe 17 and transferred to the upper chamber 12 by the particular position of the four-way cock 15 simultaneously ensuring the putting of the chamber 11 into communication with the pipe 18.

To make an infusion, a dose 44 of a product to be infused is placed in the cup 25 which is then mounted and tightened to the bottom part of the infuser body 3. The operating handle 16 is then operated to turn the four-way cock 15 so as to put the chamber 12, on the one hand into communication with the pipe 18, and on the other hand, the chamber 11 with the pipe 17. Cold water under pressure delivered by the pipe 17 is introduced into the chamber 11 and thrusts the driving piston 10 which, in its vertical upstroke, actuates the infuser piston 6 by means of the rod 7. As the upstroke of the driving piston 10 progresses, the cold water filling the chamber 12 is progressively sent along the pipe 18 to reach the connection 39 of the temperature regulating device 1. The cold water coming from the chamber 12 consequently penetrates into the tubular body 37 into which it is compelled, owing to the presence of the disturber 42, to follow the course diagrammatized by the arrows, before being able to then reach the connection 40 and emptying pipe 43. The passing of cold water coming from the chamber 12 thus cools the whole of the tubular body 37, and more particularly, the terminal part and bottom 38 which directly take part of the calories of the fraction of water filling the cavity 33. This circulation has the consequence of efficiently cooling the water filling the cavity 33 and brings it to a temperature in the vicinity of 50° C., at the moment when the infuser piston 6 uncovers the channel 35. The depression created as well as the pressure prevailing in the boiler 28 set up a new hot water intake which pushes the water, cooled down to 50° C. occupying the cavity 33, towards the bore 5. This cooled water moistens the powdered product 44 and produces a first infusion of this product without subjecting it to an excessive temperature which would result in scorching or destroying both its flavor and taste. After admitting the first water fraction previously cooled in the cavity 33, the second fraction coming from the boiler 28 also passes through the cavity 33 in which it undergoes partial cooling to make the temperature drop to about 90° C. This second water fraction which is hotter than the first moistening and infusion fraction, then penetrates into the bore 5 in which it can be kept for a given time by regulating the infusion time control associated with the controlling members of the machine. The starting up of this time infusion control device then effects the reversing of the four-way cock 15 which puts the chamber 11 into relation with the return or discharge pipe and the chamber 12 communicates with the intake pipe 17 of the water arriving under pressure 17. The cold water under pressure thrusts the driving piston 10 which pusher the cold water contained in the chamber 11 towards the temperature regulating device 1. The cold water circulating in the device 1 ensures, as described above, at least as soon as the infuser piston 6 has closed the channel opening 35, the cooling of the fraction of water filling the cavity 33 and which is intended to set up, during the subsequent preparation, the moistening fraction introduced into the infuser body 3 at a temperature of about 50° C.

During its downstroke, the infuser piston 6 pushes the hot infusion water filling the bore 5 to make it pass through the dose 44 of moistened and partly infused product by the first fraction of water at 50° C. In this way, the principles contained in the infusion product dose 44 are extracted, this extraction being conveyed by the taps 27 towards a receptacle placed under the cup 25 for this purpose.

The cold water circulating in the temperature regulating device resulting from the alternating displacement of the driving piston 10, thus automatically ensures, for each of its strokes, a partial cooling of a first fraction of water filling the cavity 33 and intended to ensure, when subsequent infusion is made, moistening at a suitable temperature of the dose of infusion product previously placed in the cup 25. In this manner, it is certain that every time an infusion is made, it will not be scorched, and a proper extraction will be effected enabling it to retain all its flavor and taste qualities.

It should be noticed that the particular arrangement of the temperature regulating device also enables, even when the machine is run for a long time, to obtain successive infusions having regular flavor and taste qualities. Actually, the intake of the first fraction coming from the cavity 33, and partly cooled by the cold water circulating inside the regulating device, enables the infuser body 3 to be partly cooled and also kept at a relatively low temperature by direct contact with the tubular body 37 of the regulating device. In this way, the infuser body 3 is kept at a suitable temperature by thus preventing the evaporation of the water fraction admitted taking place after prolonged working, by simple contact with the walls of the infuser body 3 in conventional machines, in which the infuser body 3 is progressively raised to an excessive temperature of 100° to 110° C. by the simple passage at water coming from the boiler 28 and normally introduced at a temperature of about 120° C. Moreover, infusing and extracting of active principles by fractions of water never exceeding 90° C. enables rapid and almost instantaneous drying to be guaranteed of the grounds contained in the cup which can thus be removed from the infuser body 3 immediately after infusing, for filling it with a new preparation.

Although not shown, it will be understood that the disturber 42 made of a plate or strip with a smooth surface, could comprise projections, rough places, cracks, bosses or any other similar shape for further disturbing cold water circulation, so as to favorize heat exchange with the tubular body 37 and bottom 38 plunging in the water fraction called infusing and moistening fraction held in the cavity 33. Furthermore, the device could be made differently in certain cases and consist of a tubular body traversing the cavity 33 and whose ends are kept in relation with the pipe 18 and piping 43.

The invention is not restricted to the example of embodiment, shown and described in detail, for various modifications can be applied to it without going outside its scope. In particular, it can be made as a tubular body 37 so that it comprises at least two disturbers arranged and placed relatively for creating a winding circulation course.

I claim:

1. Device for regulating the temperature of infusion water in a machine for making coffee and similar infusions comprising an infuser body containing an infuser piston rigidly attached to a driving piston housed in a cylinder, said driving piston defining in said cylinder two variable volume chambers, a four-way cock to put into communication alternatively said two variable volume chambers respectively with an inlet pipe for cold water under pressure and with a discharge pipe, characterized in that it is formed by a tubular body provided with two connections, of which one is branched on to the cold water discharge pipe coming from the driving piston chambers and the other connected to an emptying pipe, said tubular body being fitted in the infuser body for traversing at least part a cavity provided for holding infusion water defined by the body, and being kept in communication, on the one hand, with a plunger tube partly interned in a boiler for providing hot water under pressure, and on the other hand, with at least one duct made in the infuser body to emerge in the cylinder of the infuser piston.

2. Device according to claim 1 in which the tubular body contains at least one disturber placed at least partly perpendicularly to the flow direction of the cold water coming from the driving cylinder chambers.

3. Device according to claim 2, characterized in that the disturber is provided with projections, wedges and other similar members whereby favorizing the disturbing of the cold water made to traverse the temperature regulating device.

4. Device according to one of the claim 2, characterized in that the disturber is placed inside the tubular body for creating a winding circulation path.

5. Device according to one of the claim 2, characterized in that the tubular body contains more than one disturber.

6. Device according to claim 1 in which the tubular body is of slight thickness made of a material with good heat exchange characteristics and contains a removable disturber made by at least one plate or strip whose width is approximately equal to the diameter of the tubular body and whose length is provided for arranging with the bottom of the tubular body a space appreciably equal to the penetrating height of said body in the cavity holding the infusion water.

7. Device according to claim 1, characterized in that the tubular body forms, at its top part normally placed outside the infuser body after fitting, two connections for linking up with the cold water evacuation pipe of the two chambers of the driving cylinder and with the emptying piping.